(12) United States Patent
Yadav et al.

(10) Patent No.: US 8,793,226 B1
(45) Date of Patent: Jul. 29, 2014

(54) SYSTEM AND METHOD FOR ESTIMATING DUPLICATE DATA

(75) Inventors: Sandeep Yadav, Sunnyvale, CA (US);
Don Trimmer, Sunnyvale, CA (US);
Yong Cho, Cambell, CA (US)

(73) Assignee: NetApp, Inc., Sunnyvale, CA (US)

( * ) Notice: Subject to any disclaimer, the term of this patent is extended or adjusted under 35 U.S.C. 154(b) by 1644 days.

(21) Appl. No.: 11/846,033

(22) Filed: Aug. 28, 2007

(51) Int. Cl.
*G06F 17/30* (2006.01)

(52) U.S. Cl.
USPC .......................................... 707/692; 707/693

(58) Field of Classification Search
CPC ................................................ G06F 17/30159
See application file for complete search history.

(56) References Cited

U.S. PATENT DOCUMENTS

| | | | |
|---|---|---|---|
| 4,570,217 A | 2/1986 | Allen et al. |
| 5,124,987 A | 6/1992 | Milligan et al. |
| 5,163,131 A | 11/1992 | Row et al. |
| 5,202,979 A | 4/1993 | Hilils et al. |
| 5,278,979 A | 1/1994 | Foster et al. |
| 5,403,667 A | 4/1995 | Simoens |
| 5,581,724 A | 12/1996 | Belsan et al. |
| 5,732,265 A | 3/1998 | Dewitt et al. |
| 5,819,292 A | 10/1998 | Hitz et al. |
| 5,990,810 A | 11/1999 | Williams |
| 6,061,770 A | 5/2000 | Franklin |
| 6,081,875 A | 6/2000 | Clifton et al. |
| 6,289,451 B1 | 9/2001 | Dice |
| 6,341,341 B1 | 1/2002 | Grummon et al. |
| 6,892,211 B2 | 5/2005 | Hitz |
| 7,010,553 B2 | 3/2006 | Chen et al. |
| 7,043,485 B2 | 5/2006 | Manley et al. |
| 7,072,910 B2 | 7/2006 | Kahn et al. |
| 7,079,053 B2 | 7/2006 | Kolavi |
| 7,103,602 B2 | 9/2006 | Black et al. |
| 7,124,305 B2 | 10/2006 | Margolus et al. |
| 7,127,577 B2 | 10/2006 | Koning et al. |
| 7,162,662 B1 | 1/2007 | Svarcas et al. |

(Continued)

FOREIGN PATENT DOCUMENTS

| | | |
|---|---|---|
| EP | 1349 089 | 1/2003 |
| IN | 938/DEL/2007 | 4/2007 |

(Continued)

OTHER PUBLICATIONS

Duplic8, "How to Use Duplic8," Aug. 26, 2006, http://replay.waybackmachine.org/20060826105831/http://www.kewlit.com/duplic8/howtouse.html.*

(Continued)

*Primary Examiner* — Syed Hasan
(74) *Attorney, Agent, or Firm* — Cesari and McKenna, LLP (57) ABSTRACT

The present invention provides a system and method for estimating duplicate data in a storage system. A duplicate estimation application executes on a client of a storage system selects an element from an intended destination such as, e.g., a data store of the storage system. If the element is a file (or other data container), the application reads data from the file and computes a fingerprint of the read data. The computed fingerprint is then logged in a fingerprint database, which is illustratively stored on a storage device connected to the client executing the application. This process repeats until the entire file (or other data container) has been read and fingerprinted. Once all elements have been scanned, fingerprinted and recorded, the application identifies any unique entries within the fingerprint database. Utilizing this information, the application computes an estimated space savings that may be realized by employing a data de-duplication technique.

17 Claims, 7 Drawing Sheets

(56) References Cited

U.S. PATENT DOCUMENTS

| | | | |
|---|---|---|---|
| 7,289,643 | B2 | 10/2007 | Brunk et al. |
| 7,333,993 | B2 | 2/2008 | Fair |
| 7,475,098 | B2 | 1/2009 | Patterson et al. |
| 7,584,338 | B1 * | 9/2009 | Bricker et al. ............... 711/162 |
| 2002/0194529 | A1 | 12/2002 | Doucette et al. |
| 2003/0140049 | A1 * | 7/2003 | Radatti .................... 707/100 |
| 2004/0030668 | A1 | 2/2004 | Pawlowski et al. |
| 2004/0083245 | A1 | 4/2004 | Beeler |
| 2007/0043757 | A1 * | 2/2007 | Benton et al. .............. 707/102 |
| 2007/0107058 | A1 * | 5/2007 | Schuba et al. ................ 726/23 |
| 2008/0005141 | A1 | 1/2008 | Zheng |
| 2008/0005201 | A1 | 1/2008 | Ting |
| 2008/0046445 | A1 * | 2/2008 | Passey et al. ............... 707/100 |
| 2008/0301134 | A1 | 12/2008 | Miller |
| 2010/0077160 | A1 * | 3/2010 | Liu et al. ..................... 711/162 |

FOREIGN PATENT DOCUMENTS

| | | |
|---|---|---|
| WO | WO 02/08956 | 1/2002 |
| WO | WO 2007/127360 | 11/2007 |
| WO | WO 2008/005211 | 1/2008 |
| WO | WO 2008/005212 | 1/2008 |
| WO | WO 2008/153821 | 12/2008 |

OTHER PUBLICATIONS

Patterson, D., et al., A Case for Redundant Arrays of Inexpensive Disks (RAID), Technical Report, CSD-87-391, Computer Science Division, Electrical Engineering and Computer Sciences, University of California at Berkeley 1987, 8 pgs.

U.S. Appl. No. 11/105,845 for Method and Apparatus for Identifying and Eliminating Duplicate Data Blocks and Sharing Data Blocks in a Storage System, by Zheng, et al., filed Apr. 13, 2005, 46 pgs.

Akyurek, Sedat, Placing Replicated Data to Reduce Seek Delays, Department of Computer Science, University of Maryland, UMIACS-TR-91-121, CS-TR-2746, Aug. 1991.

Bitton, Dina, Disk Shadowing, Proceedings of the 14.sup.th VLDB Conference, LA, CA (1988), 8 pages.

Business Wire, SEPATON Announces Next Generation Data De-Duplication Software; Delivers Industry's Highest Level of De-Duplication Without Affecting Backup Performance, Business Wire, May 2006, 3 pages.

Chaudhuri, Surajit, et al., Self-Tuning Technology in Microsoft SQL Server, Data Engineering Journal 22, Feb. 1999 pp. 20-27.

Chutani, Sailesh, et al., The Episode File System, In Proceedings of the USENIX Winter 1992, 18 pages.

Coyne, Robert A., et al., Storage Systems for National Information Assets, Proc. Supercomputing 92, Minneapolis, Nov. 1992, pp. 626-633.

$EMC^2$, Celerra File Server Architecture for High Availability, $EMC^2$ Corporation, Aug. 1999, 12 pages.

Finlayson, Ross S., et al., Log Files: An Extended File Service Exploiting Write-Once Storage Department of Computer Science, Stanford University, Report No. STAN-CS-87-1177, Sep. 1987, 14 pages.

Gray, Jim, et al., The Recovery Manager of the System R Database Manager, ACM Computing Surveys, (13)2:223-242 1981, 20 pages.

Hecht, Matthew S., et al. Shadowed Management of Free Disk Pages with a Linked List, ACM Transactions on Database Systems, 8/4, Dec. 1983, pp. 503-514.

Hitz, Dave et al., File System Design for an NFS File Server Appliance, Technical Report 3002, Rev. C3/95, presented Jan. 19, 1994, USENIX Winter 1994, 23 pages.

Hong, et al., Duplicate Data Elimination in a SAN File System, Proceedings of the $21^{st}$ IEEE / $12^{th}$ NASA Goddard Conference on Mass Storage Systems and Technologies (2004), 304-314.

Howard, John H, et al., Scale and Performance in a Distributed File System, Carnegie Mellon University, CMU-ITC-87-068, Aug. 5, 1987, 33 pages.

Howard, John H., An Overview of the Andrew File System, Carnegie Mellon University, CMU-ITC-88-062 1988, 6 pages.

Howard, John, H. et al., Scale and performance in a distributed file system, ACM Trans. Computer. System., 6(1), Feb. 1988 pp. 51-81.

Kazar, Michael L., et al., Decorum File System Architectural Overview, USENIX Summer Conference, Anaheim, California, 1990, 13 pages.

Kazar, Michael L., Synchronization and Caching Issues in the Andrew File System, Carnegie Mellon University, CMU-ITC-88-063, 12 pages, (1988).

Kemper, Alfons, et al., Performance Tuning for SAP R/3, Data Engineering Journal 22, Feb. 1999 pp. 33-40.

Kent, Jack et al., Optimizing Shadow Recovery Algorithms, IEEE Transactions on Software Engineering, 14(2): 155-168, Feb. 1988.

Kistler, et al., Disconnected Operation in the Coda File System, ACM Transactions on Computer Systems, vol. 10, No. 1, Feb. 1992, pp. 3-25.

Lorie, Raymond, A, Physical Integrity in a large segmented database, ACM Trans. Database Systems, 2(1): 91-104, Mar. 1977.

Muthitacharoen, et al., A Low-Bandwidth Network File System, ACM SOSP, Proceedings of the ACM Symposium on Operating System Principles, ACM, US, XP-002405303, Oct. 21, 2002, pp. 174-187.

National Institute of Standards and Technology, Federal Information Processing Standards Publication: The Keyed-Hash Message Authentication Code (HMAC), FIPS PUB 198, Information Technology Laboratory, Gaithersburg, Maryland, Mar. 2002, 20 pages.

Ousterhout, John et al., Beating the I/O Bottleneck: A Case for Log-Structured File Systems, Technical Report, Computer Science Division, Electrical Engineering and Computer Sciences, University of California at Berkeley, Oct. 30, 1988, 18 pages.

Patterson, D., et al., A Case for Redundant Arrays of Inexpensive Disks (RAID), Technical Report, CSD-87-391, Computer Science Division, Electrical Engineering and Computer Sciences, University of California at Berkeley (1987), 26 pages.

Patterson, D., et al., A Case for Redundant Arrays of Inexpensive Disks (RAID), SIGMOD International Conference on Management of Data, Chicago, IL, USA, Jun. 1-3, 1988, SIGMOD Record (17):3:109-16 (Sep. 1988).

Peterson, Zachary Nathaniel Joseph, Data Placement for Copy-on-Write Using Virtual Contiguity, University of CA, Santa Cruz, Master of Science in Computer Science Thesis, Sep. 2002.

Quinlan, S., A Cached WORM File System, Software-Practice and Experience, 21(12):1289-1299 (1991).

Rosenblum, Mendel, et al. The Design and Implementation of a Log-Structured File System Jul. 24, 1991 pp. 1-15.

Rosenblum, Mendel, The Design and Implementation of a Log-Structured File System, 1992, pp. 1-93.

Rosenblum, Mendel, et al., The Design and Implementation of a Log-Structured File System, In Proceedings of ACM Transactions on Computer Systems, (10)1:26-52, Feb. 1992.

Rosenblum, Mendel, et al., The LFS Storage Manager, Computer Science Division, Electrical Engin. And Computer Sciences, Univ. of CA, presented at Summer '90 USENIX Technical Conference, Anaheim, CA Jun. 1990, 16 pages.

Schiefer, Berni, et al., DB2 Universal Database Performance Tuning, Data Engineering Journal 22, Feb. 1999 pp. 12-19.

Seltzer, Margo I., et al., Journaling Versus Soft Updates: Asynchronous Meta-Data Protection in File Systems, Proceedings of 200 USENIX Annual Technical Conference, Jun. 18-23, 2000.

Shasha, Dennis, Tuning Time Series Queries in Finance: Case Studies and Recommendations, Data Engineering Journal 22, Feb. 1999 pp. 41-47.

Sidebotham, Bob, Volumes: The Andrew File System Data Structuring Primitive, EEUG Conference Proceedings, Manchester, UK, Autumn 1986.

Subramanian, Muralidhar, et al., Performance Challenges in Object-Relational DBMSs, Data Engineering Journal 22, Feb. 1999 pp. 28-32.

Weikum, Gerhard, et al., Towards Self-Tuning Memory Management for Data Servers, Data Engineering Journal 22, Feb. 1999 pp. 3-11.

(56) References Cited

OTHER PUBLICATIONS

West, Michael, et al. The ITC Distributed File System: Prototype and Experience, Carnegie-Mellon University, Technical Report CMU-ITC-040, Mar. 1985, 17 pages.

Zayas, Edward R., AFS-3 Programmer's Reference: Architectural Overview, Transarc Corporation, Pittsburgh, PA, 1.0 edition 1991, 37 pages.

Zheng, et al., Method and Apparatus for Identifying and Eliminating Duplicate Data Blocks and Sharing Data Blocks in a Storage System, U.S. Appl. No. 11/105,895, filed Apr. 13, 2005, 46 pgs.

Notification of Transmittal of the International Search Report and the Written Opinion of the International Searching Authority, or the Declaration, International Filing Date: Jun. 25, 2007, International Application No. PCT/US2007/014664, Applicant: Network Appliance, Inc., Date of Mailing: Apr. 9, 2008, pp. 1-12.

Notification of Transmittal of the International Search Report and the Written Opinion of the International Searching Authority, or the Declaration, International Filing Date: Jun. 25, 2007, International Application No. PCT/US2007/014666, Applicant: Network Appliance, Inc., Date of Mailing: Feb. 22, 2008, pp. 1-18.

Notification of Transmittal of the International Search Report and the Written Opinion of the International Searching Authority, or the Declaration, International Filing Date: May 29, 2008, International Application No. PCT/US2008/006805, Applicant: Network Appliance, Inc., Date of Mailing: Oct. 27, 2008, pp. 1-15.

\* cited by examiner

SYSTEM AND METHOD FOR ESTIMATING DUPLICATE DATA

FIELD OF THE INVENTION

The present invention relates to storage systems and, more specifically, to a technique for estimating duplicate data in a storage system.

BACKGROUND OF THE INVENTION

A storage system typically comprises one or more storage devices into which information may be entered, and from which information may be obtained, as desired. The storage system includes a storage operating system that functionally organizes the system by, inter alia, invoking storage operations in support of a storage service implemented by the system. The storage system may be implemented in accordance with a variety of storage architectures including, but not limited to, a network-attached storage environment, a storage area network and a disk assembly directly attached to a client or host computer. The storage devices are typically disk drives organized as a disk array, managed according to a storage protocol, wherein the term "disk" commonly describes a self-contained rotating magnetic media storage device. The term disk in this context is synonymous with hard disk drive (HDD) or direct access storage device (DASD).

Storage of information on the disk array is preferably implemented as one or more storage "volumes" of physical disks, defining an overall logical arrangement of disk space. The disks within a volume are typically organized as one or more groups, wherein each group may be operated as a Redundant Array of Independent (or Inexpensive) Disks (RAID). Most RAID implementations enhance the reliability/integrity of data storage through the redundant writing of data "stripes" across a given number of physical disks in the RAID group, and the appropriate storing of redundant information (parity) with respect to the striped data. The physical disks of each RAID group may include disks configured to store striped data (i.e., data disks) and disks configured to store parity for the data (i.e., parity disks). The parity may thereafter be retrieved to enable recovery of data lost when a disk fails. The term "RAID" and its various implementations are well-known and disclosed in *A Case for Redundant Arrays of Inexpensive Disks (RAID)*, by D. A. Patterson, G. A. Gibson and R. H. Katz, Proceedings of the International Conference on Management of Data (SIGMOD), June 1988.

The storage operating system of the storage system may implement a high-level module, such as a file system, to logically organize data containers for the information. For example, the information may be stored on the disks as a hierarchical structure of data containers, such as directories, files, and blocks. Each "on-disk" file may be implemented as set of data structures, i.e., disk blocks, configured to store information, such as the actual data for the file. These data blocks are organized within a volume block number (vbn) space that is maintained by the file system. The file system may also assign each data block in the file a corresponding "file offset" or file block number (fbn). The file system typically assigns sequences of fbns on a per-file basis, whereas vbns are assigned over a larger volume address space. The file system organizes the data blocks within the vbn space as a "logical volume"; each logical volume may be, although is not necessarily, associated with its own file system. The file system typically consists of a contiguous range of vbns from zero to n, for a file system of size n+1 blocks.

In a large file system, it is common to find duplicate occurrences of individual blocks of data. Duplication of data blocks may occur when, e.g., two or more files (or other data containers) share common (identical) data or where a given set of data occurs at multiple places within a given file. Duplication of data results in inefficient use of storage space by storing the identical data in a plurality of differing locations served by a storage system.

Certain storage operating systems that may be utilized on storage systems include functionality to perform one or more data de-duplication techniques to thereby reduce the amount of duplicate data stored within the storage systems. Typically, the invocation of the data de-duplication functionality may require an upgrade to a new version of a storage operating system. Alternatively, a storage system may need to be replaced with one from a different vendor to obtain data de-duplication functionality. As these operations consume substantial amounts of time and/or money, system administrators often desire information to determine whether the return on their investment, i.e., the amount of space saved by utilizing a de-duplication technique, is worth the expense and/or time required to install the data de-duplication functionality. Furthermore, in systems utilizing a data de-duplication technique, a system administrator may desire to know the efficiency with which data has been de-duplicated to ensure that configuration settings have been optimized based on, e.g., the type of data being stored, etc.

SUMMARY OF THE INVENTION

The present invention overcomes the disadvantages of the prior art by providing a system and method for estimating duplicate data in a storage system. According to an illustrative embodiment of the invention, a duplicate estimation application executes on a client of a storage system and is invoked by an administrator desiring an estimation of the amount of duplicate data on the system or on a sub-component, e.g., volumes, etc., thereof. Upon execution, the duplicate estimation application selects an element from an intended destination such as, e.g., a data store of the storage system. If the element is a file (or other data container), the application reads data from the file and computes a fingerprint of the read data. The computed fingerprint is then logged in a fingerprint database, such as a fingerprint file or other data store. This process repeats until the entire file (or other data container) has been read and fingerprinted. If the selected element is a directory, the application recursively scans the directory by selecting each of the files (or other data containers) contained therein and repeating the above-described process. If the selected element is a link, such as a hard and/or soft link, the application records state information, e.g., increments a counter to ensure that multiple references to a file (or other data container) do not over estimate data de-duplication savings.

Once all elements have been scanned, fingerprinted and recorded, the application identifies any unique entries within the fingerprint database, i.e., the number of entries having unique fingerprints in the fingerprint database. Utilizing this information, the application computes an estimated space savings that may be realized by employing a data de-duplication technique. Generally, only one copy of each entry having a unique fingerprint is retained after a de-duplication operation. Thus, the estimated storage savings may be computed by comparing the total number of entries to the number of entries having unique fingerprints. The estimated savings is then displayed to an administrator.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

The present invention provides a system and method for estimating duplicate data in a storage system. A duplicate estimation application executes on a client of a storage system and is invoked by an administrator desiring an estimation of the amount of duplicate data on the system or on a sub-component, e.g., volumes, etc., thereof. Upon execution, the duplicate estimation application selects an element from an intended destination such as, e.g., a data store of the storage system. If the element is a file (or other data container), the application reads data from the file and computes a fingerprint of the read data. The computed fingerprint is then logged in a fingerprint database. This process repeats until the entire file (or other data container) has been read and fingerprinted. If the selected element is a directory, the application scans the directory by selecting each of the files (or other data containers) and repeating the above-described process. If the selected element is a link, such as a hard and/or soft link, the application records state information, e.g., increments a counter to ensure that multiple references to a file (or other data container) do not over estimate data deduplication savings.

Once all elements have been scanned, fingerprinted and recorded, the application identifies any unique entries within the fingerprint database, i.e., the number of entries having unique fingerprints in the fingerprint database. Utilizing this information, the application computes an estimated space savings that may be realized by employing a data de-duplication technique. Generally, only one copy of each entry having a unique fingerprint stored in the fingerprint database is retained after a de-duplication operation is performed on the data store. Illustratively, the fingerprint database is stored on one or more storage devices accessible to the client on which the duplicate estimation application is executing. The duplicate estimation application may implement the database or may utilize a separate database server. Thus, the estimated storage savings may be computed by comparing the total number of entries to the number of entries having unique fingerprints. The estimated savings is then displayed to an administrator.

A. Storage System Environment

Figure 1:
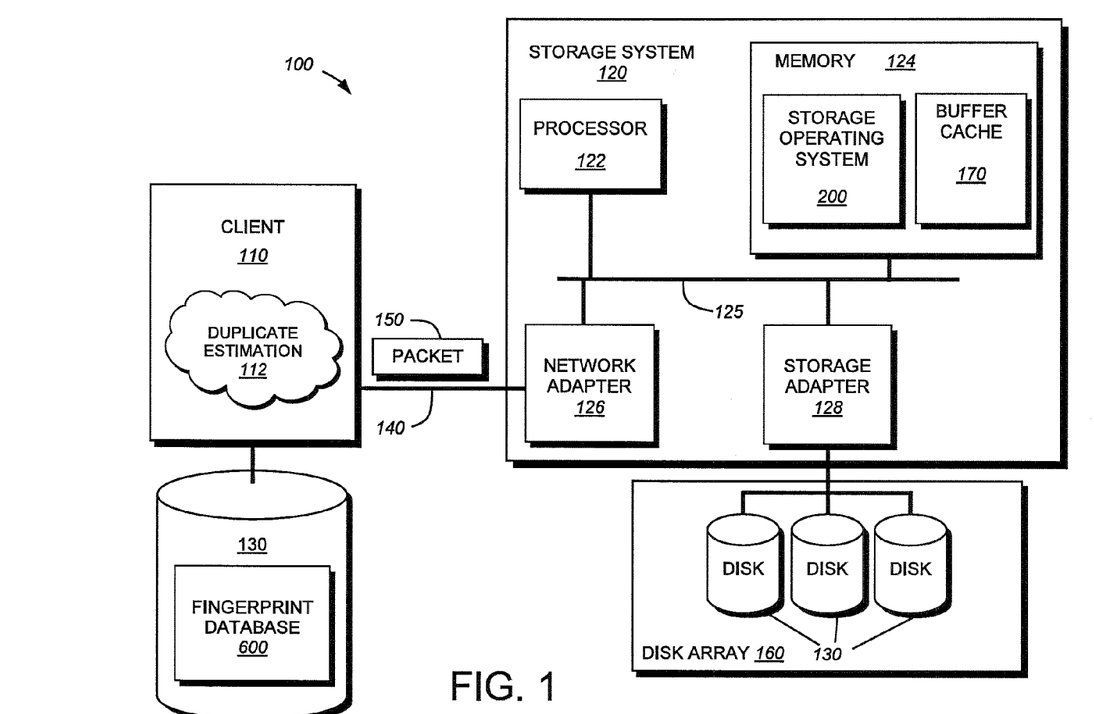
FIG. 1 is a schematic block diagram of a storage system environment in accordance with an illustrative embodiment of the present invention.

FIG. 1 is a schematic block diagram of an illustrative storage system environment 100 including a storage system 120 that may be advantageously used with the present invention. The storage system is a computer that provides storage service relating to the organization of information on storage devices, such as disks 130 of a disk array 160. The storage system 120 comprises a processor 122, a memory 124, a network adapter 126 and a storage adapter 128 interconnected by a system bus 125. The storage system 120 also includes a storage operating system 200 that illustratively implements a high-level module, such as a file system, to logically organize the information as a hierarchical structure of data containers, such as directories, files, and special types of files called virtual disks (hereinafter "blocks") on the disks.

In the illustrative embodiment, the memory 124 comprises storage locations that are addressable by the processor 122 and adapters for storing software program code. A portion of the memory may be further organized as a "buffer cache" 170 for storing data structures, such as fingerprints, associated with the present invention. The processor 122 and adapters may, in turn, comprise processing elements and/or logic circuitry configured to execute the software program code and to manipulate the data structures. Storage operating system 200, portions of which are typically resident in memory and executed by the processing elements, functionally organizes the system 120 by, inter alia, invoking storage operations executed by the storage system. It will be apparent to those skilled in the art that other processing and memory means, including various computer readable media, may be used for storing and executing program instructions pertaining to the inventive technique described herein.

The network adapter 126 comprises the mechanical, electrical and signaling circuitry needed to connect the storage system 120 to a client 110 over a computer network 140, which may comprise a point-to-point connection or a shared medium, such as a local area network. Illustratively, the computer network 140 may be embodied as an Ethernet network or a Fibre Channel (FC) network. The client 110 may communicate with the storage system over network 140 by exchanging discrete frames or packets 150 of data according to pre-defined protocols, such as the Transmission Control Protocol/Internet Protocol (TCP/IP).

The client 110 may be a general-purpose computer configured to execute applications, such as a duplicate estimation application 112 of the present invention. Moreover, the client 110 may interact with the storage system 120 in accordance with a client/server model of information delivery. That is, the client 110 may request the services of the storage system 120, and the system may return the results of the services requested by the client 110, by exchanging packets 150 over the network 140. The client 110 may issue packets including file-based access protocols, such as the Common Internet File System (CIFS) protocol or Network File System (NFS) protocol, over TCP/IP when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

Figure 2:
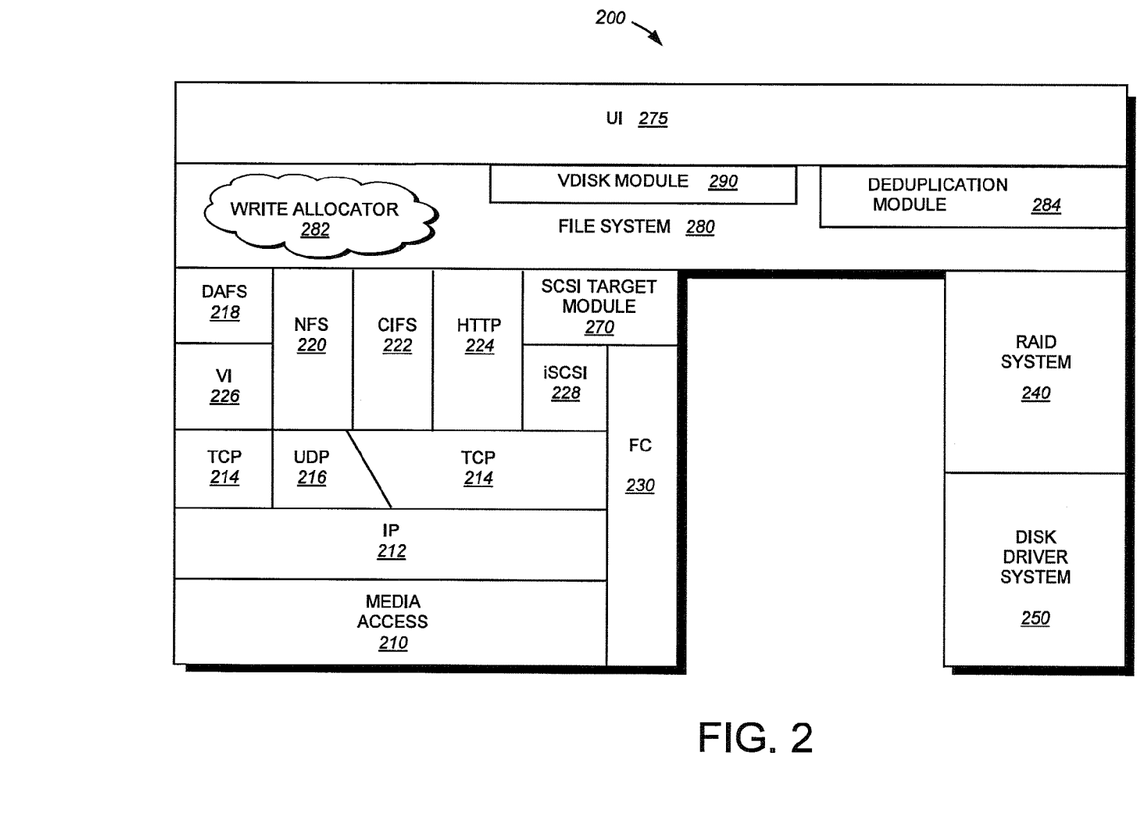
FIG. 2 is a schematic block diagram of a storage operating system in accordance with an illustrative embodiment of the present invention.

The novel duplicate estimation application 112 illustratively performs estimation of duplicate data on the storage system 120 in accordance with an illustrative embodiment of the present invention. It should be noted that in alternative embodiments of the present invention, the duplicate estimation application 112 may be, e.g., integrated within an operating system (not shown) of the client 110. Furthermore, the duplicate estimation application 112 may also be integrated within the storage operating system 200 of the storage system 120. However, one noted advantage of having a separate duplicate estimation application 112 involves an environment wherein the storage operating system 200 does not support de-duplication. Here, the duplicate estimation application 112 may be utilized to identify an estimate of the potential storage savings available by upgrading to a storage operating system 200 that supports, i.e., incorporates, de-duplication functionality. As such, description of the duplicate estimation application 112 executing on client 110 should be taken as exemplary only. Furthermore, in alternative embodiments of the present invention, the duplicate estimation application 112 may be configured to execute automatically. For example, the duplicate estimation application may be configured to execute, without a direct user invocation, on, e.g., a predefined schedule, etc.

Also operatively interconnected with the client 110 is a storage device, such as a disk 130, that is utilized to store a fingerprint database 600, described further below in reference to FIG. 6. The fingerprint database 600 may be implemented using a variety of techniques. For example, the fingerprint database 600 may be implemented as a fingerprint file, or may utilize other data structures to maintain the fingerprints. As such, the description of a fingerprint database should be taken as exemplary only and should be construed to mean any form of data storage of fingerprints, including, e.g., fingerprint log files, etc.

The storage adapter 128 cooperates with the storage operating system 200 executing on the system 120 to access information requested by a user (or client). The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on disks 130, such as hard disk drives (HDDs) and/or direct access storage devices (DASDs), of array 160. The storage adapter 128 includes input/output (I/O) interface circuitry that couples to the disks 130 over an I/O interconnect arrangement, such as a conventional high-performance, FC serial link topology.

Storage of information on array 160 is preferably implemented as one or more storage "volumes" that comprise a collection of physical storage disks 130 cooperating to define an overall logical arrangement of volume block number (vbn) space on the volume(s). Each logical volume is generally, although not necessarily, associated with its own file system. The disks within a logical volume/file system are typically organized as one or more groups, wherein each group may be operated as a Redundant Array of Independent (or Inexpensive) Disks (RAID), managed according to a RAID protocol. Most RAID implementations, such as a RAID-4 level implementation, enhance the reliability/integrity of data storage through the redundant writing of data "stripes" across a given number of physical disks in the RAID group, and the appropriate storing of parity information with respect to the striped data. The illustrative RAID protocol also implements a 32-bit checksum value for each block of data written to disk, to verify data integrity. The illustrative example of a RAID implementation is a RAID-4 level implementation, although it should be understood that other types and levels of RAID implementations may be used in accordance with the inventive principles described herein. Likewise, other implementations and/or protocols may be used to organize the disks of the logical volume/file system.

B. Storage Operating System

To facilitate access to the disks 130, the storage operating system 200 implements a write-anywhere file system that cooperates with virtualization modules to "virtualize" the storage space provided by disks 130. Illustratively, the file system logically organizes the information as a hierarchical structure of named data containers, such as directories and files on the disks. Each "on-disk" file may be implemented as set of disk blocks configured to store information, such as data, whereas the directory may be implemented as a specially formatted file in which names and links to other files and directories are stored. The virtualization modules allow the file system to further logically organize information as a hierarchical structure of data containers, such as blocks on the disks that are exported as named logical unit numbers (luns).

In the illustrative embodiment, the storage operating system is preferably the NetApp® Data ONTAP® operating system available from Network Appliance, Inc., Sunnyvale, Calif., that implements a Write Anywhere File Layout (WAFL®) file system. However, it is expressly contemplated that any appropriate storage operating system may be enhanced for use in accordance with the inventive principles described herein. As such, where the term "Data ONTAP" is employed, it should be taken broadly to refer to any storage operating system that is otherwise adaptable to the teachings of this invention.

FIG. 2 is a schematic block diagram of a storage operating system 200 that may be advantageously used with the present invention. The storage operating system comprises a series of software layers organized to form an integrated network protocol stack or, more generally, a multi-protocol engine that provides data paths for clients to access information stored on the storage system using block and file access protocols. The protocol stack includes a media access layer 210 of network drivers (e.g., gigabit Ethernet drivers) that interfaces to network protocol layers, such as the IP layer 212 and its supporting transport mechanisms, the TCP layer 214 and the User Datagram Protocol (UDP) layer 216. A file system protocol layer provides multi-protocol file access and, to that end, includes support for the Direct Access File System (DAFS) protocol 218, the NFS protocol 220, the CIFS protocol 222, and the Hypertext Transfer Protocol (HTTP) protocol 224. A Virtual Interface (VI) layer 226 implements the VI architecture to provide direct access transport (DAT) capabilities, such as RDMA, as required by the DAFS protocol 218.

An iSCSI driver layer 228 provides block protocol access over the TCP/IP network protocol layers, while a FC driver layer 230 receives and transmits block access requests and responses to and from the storage system. The FC and iSCSI drivers provide FC-specific and iSCSI-specific access control to the blocks and, thus, manage exports of luns to either iSCSI or FCP or, alternatively, to both iSCSI and FCP when accessing the blocks on the storage system. In addition, the storage operating system includes a storage module embodied as a RAID system 240 that implements a storage (e.g., RAID) protocol manage the storage and retrieval of information to and from the volumes/disks in accordance with I/O operations, and a disk driver system 250 that implements a disk access protocol such as, e.g., the SCSI protocol.

Bridging the disk software layers with the integrated network protocol stack layers is a virtualization system that is implemented by a file system 280 interacting with virtualization modules illustratively embodied as, e.g., vdisk module 290 and SCSI target module 270. The vdisk module 290 is layered on the file system 280 to enable access by administrative interfaces, such as a user interface (UI) 275, in response to a user (system administrator) issuing commands to the storage system. The SCSI target module 270 is disposed between the FC and iSCSI drivers 228, 230 and the file system 280 to provide a translation layer of the virtualization system between the block (lun) space and the file system space, where luns are represented as blocks. The UI 275 is disposed over the storage operating system in a manner that enables administrative or user access to the various layers and systems.

According to an illustrative embodiment of the present invention, the storage operating system 200 includes a deduplication module 284. The deduplication module 284 may execute a data de-duplication process, e.g., periodically, in response to a predefined condition (e.g., the storage system reaching a predefined capacity), and/or in response to a command from an administrator or user, through the UI 275. Also, according to alternative embodiments, the deduplication module 284 may be integrated into a write allocator process 282, to perform a data deduplication procedure during the allocation of write operations to the disk array 160. Such a data deduplication procedure may modify pointers within indirect blocks to point to a single data block instead of multiple data blocks containing identical data as described in U.S. patent application Ser. No. 11/105,895 entitled METHOD AND APPARATUS FOR IDENTIFYING AND ELIMINATING DUPLICATE DATA BLOCKS AND SHARING DATA BLOCKS IN A STORAGE SYSTEM, by Ling Zheng, et al., the contents of which are hereby incorporated by reference. It should be noted that the principles of the present invention may be utilized with any form of de-duplication technique. As such, the description of a de-duplication module 284 being integrated with a file system 280 should be taken as exemplary only.

The file system is illustratively a message-based system that provides logical volume management capabilities for use in access to the information stored on the storage devices, such as disks. That is, in addition to providing file system semantics, the file system 280 provides functions normally associated with a volume manager. These functions include (i) aggregation of the disks, (ii) aggregation of storage bandwidth of the disks, and (iii) reliability guarantees, such as mirroring and/or parity (RAID). The file system 280 illustratively implements a write-anywhere file system (such as the WAFL® file system available from Network Appliance, Inc., Sunnyvale, Calif.) having an on-disk format representation that is block-based using, e.g., 4 kilobyte (KB) blocks and using index nodes ("inodes") to identify files and file attributes (such as creation time, access permissions, size, and block location). The file system uses files to store metadata describing the layout of its file system; these metadata files include, among others, an inode file. A file handle, i.e., an identifier that includes an inode number, is used to retrieve an inode from disk.

Broadly stated, all inodes of the write-anywhere file system are organized into the inode file. A file system (FS) info block specifies the layout of information in the file system and includes an inode of a file that includes all other inodes of the file system. Each logical volume (file system) has an FS info block that is preferably stored at a fixed location within, e.g., a RAID group. The inode of the inode file may directly reference (point to) blocks of the inode file or may reference indirect blocks of the inode file that, in turn, reference direct blocks of the inode file. Within each direct block of the inode file are embedded inodes, each of which may reference indirect blocks that, in turn, reference data blocks of a file.

Operationally, a read request from the client 110 is forwarded as a packet 150 over the computer network 140 and onto the storage system 120 where it is received at the network adapter 126. A network driver (of layer 210 or layer 230) processes the packet and, if appropriate, passes it on to a network protocol and file access layer for additional processing prior to forwarding to the write-anywhere file system 280. Here, the file system generates operations to load (retrieve) the requested data from disk 130 if it is not resident "in core", i.e., in the buffer cache 170. If the information is not in the cache, the file system 280 indexes into the inode file using the inode number to access an appropriate entry and retrieve a logical vbn. The file system then passes a message structure including the logical vbn to the RAID system 240; the logical vbn is mapped to a disk identifier and disk block number (disk, dbn) and sent to an appropriate driver (e.g., SCSI) of the disk driver system 250. The disk driver accesses the dbn from the specified disk 130 and loads the requested data block(s) in buffer cache 170 for processing by the storage system. Upon completion of the request, the storage system (and operating system) returns a reply to the client 110 over the network 140. A write operation issued by the client 110 to the storage system 120 follows the same "path" through the storage system 100.

It should be noted that the software "path" through the storage operating system layers described above needed to perform data storage access and write operations for client requests received at the storage system may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by storage system 120 in response to a request issued by client 110. Moreover, in another alternate embodiment of the invention, the processing elements of adapters 126, 128 may be configured to offload some or all of the packet processing and storage access operations, respectively, from processor 122, to thereby increase the performance of the storage service provided by the system. It is expressly contemplated that the various processes, architectures and procedures described herein can be implemented in hardware, firmware or software operating as a single or distributed system.

As used herein, the term "storage operating system" generally refers to the computer-executable code operable to perform a storage function in a storage system, e.g., that manages data access and may, in the case of a file server, implement file system semantics. In this sense, the Data ONTAP® software is an example of such a storage operating system implemented as a microkernel and including the file system 280 to implement the WAFL® file system semantics and manage data access. Illustratively, the storage operating system 200 includes a deduplication module 284 for comparing fingerprints and implementing data deduplication; however, in alternate embodiments, the fingerprint comparison and data deduplication functionality may be implemented in other modules of the storage operating system 200. The storage operating system can also be implemented as an application program operating over a general-purpose operating system, such as UNIX® or Windows XP®, or as a general-purpose operating system with configurable functionality, which is configured for storage applications as described herein.

In addition, it will be understood to those skilled in the art that the inventive technique described herein may apply to any type of special-purpose (e.g., file server, filer, or multi-protocol storage appliance) or general-purpose computer, including a standalone computer or portion thereof, embodied as or including a storage system 120. An example of a multi-protocol storage appliance that may be advantageously used with the present invention is described in commonly owned U.S. Patent Application Publication No. 2004/0030668 A1, filed on Aug. 9, 2002, now issued as U.S. Pat. No. 7,873,700, titled MULTI-PROTOCOL STORAGE APPLIANCE THAT PROVIDES INTEGRATED SUPPORT FOR FILE AND BLOCK ACCESS PROTOCOLS, by Brian Pawlowski, et al. Moreover, the teachings of this invention can be adapted to a variety of storage system architectures including, but not limited to, a network-attached storage environment, a storage area network, and a disk assembly directly-attached to a client or host computer. The term "storage system" should therefore be taken broadly to include such arrangements in addition to any subsystems configured to perform a storage function and associated with other equipment or systems.

C. On-Disk File System Structures

Figure 3:
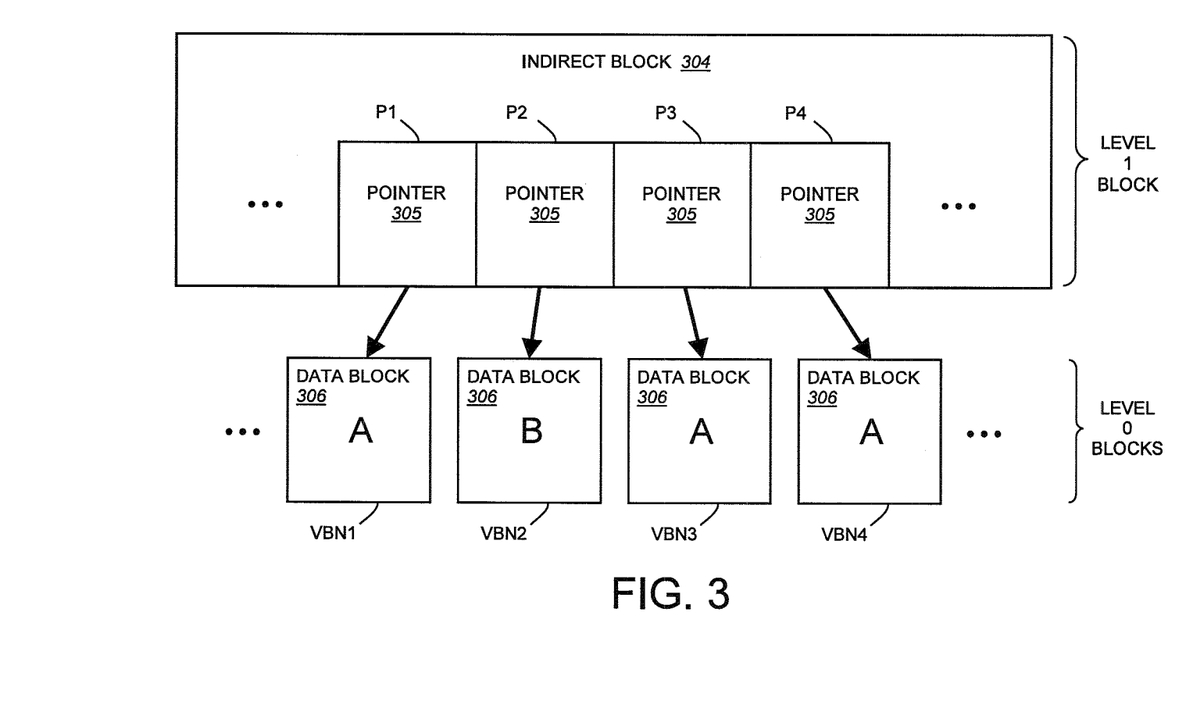
FIG. 3 is a schematic block diagram of an indirect block with pointers directed to a plurality of duplicate data blocks in accordance with an illustrative embodiment of the present invention.

FIG. 3 is a schematic block diagram of a level 1 indirect block 304 in accordance with an illustrative embodiment of the present invention. Illustratively, the indirect block 304 includes a plurality of pointers 305, e.g., P1-P4. Each pointer 305 points to (references) a level 0 data block 306 that is stored at a particular volume block number (vbn). Illustratively, the data blocks stored at vbn3 and vbn4 contain identical data (e.g., A) as that of the first data block stored at vbn1 (e.g., A), thereby making their associated fingerprints identical. Having three copies of identical data is wasteful of file system resources; therefore the deduplication module 284 may modify pointers P3 and P4 (e.g., in accordance with a data de-duplication procedure) to reference vbn1, thereby de-allocating vbn3 and vbn4 and conserving storage space while preserving the integrity of the data container.

Figure 4:
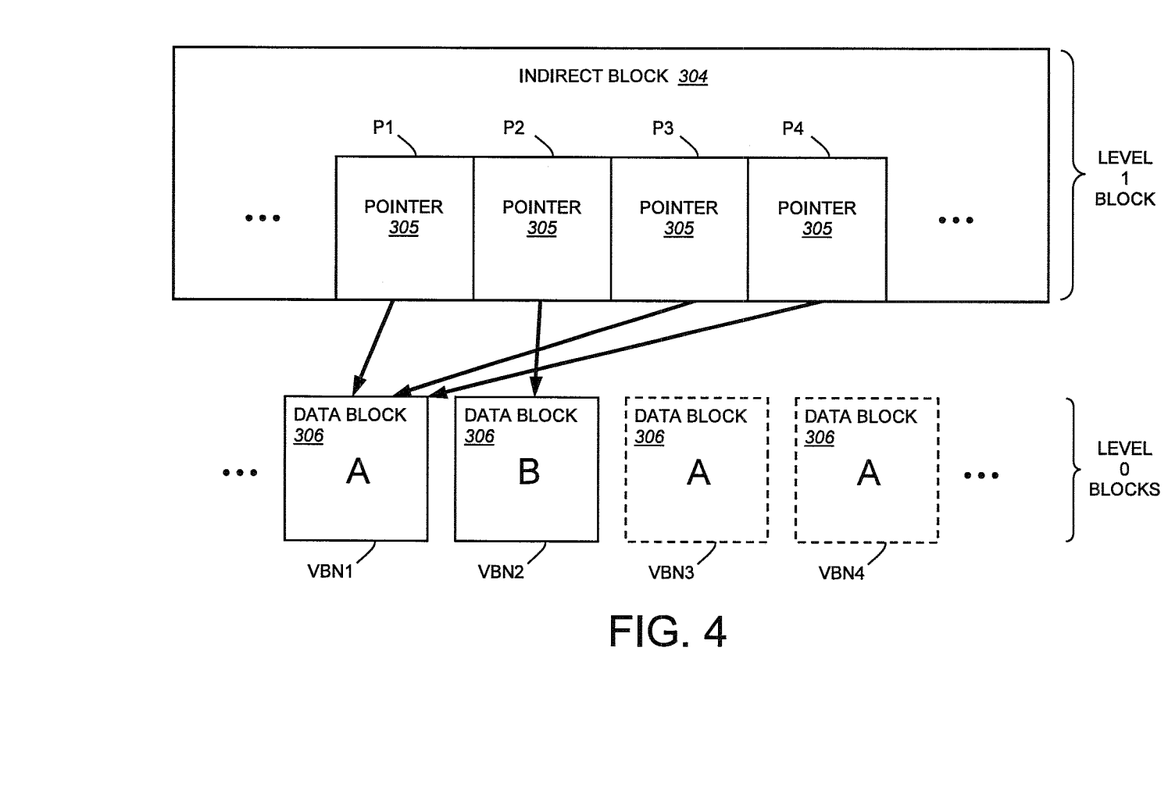
FIG. 4 is a schematic block diagram of an indirect block with pointers to de-duplicated data blocks in accordance with an illustrative embodiment of the present invention.

FIG. 4 is a schematic block diagram illustrating the level 1 indirect block 304 of FIG. 3 after performance of an exemplary data deduplication procedure in accordance with an illustrative embodiment of the present invention. After the exemplary procedure, each unique data block is associated with a unique fingerprint, and identical file blocks of the data container are associated with a unique data block, which, in turn, is associated with a unique fingerprint. A technique for implementing the deduplication procedure is further described in the above-incorporated U.S. patent application Ser. No. 11/105,895 entitled METHOD AND APPARATUS FOR IDENTIFYING AND ELIMINATING DUPLICATE DATA BLOCKS AND SHARING DATA BLOCKS IN A STORAGE SYSTEM, by Ling Zheng, et al. Thus, in this example, a space savings of 8 KB, representing two 4 KB blocks (vbn3 and vbn4) is possible due to de-duplication.

D. Estimation of Duplicate Data

The present invention provides a system and method for estimating duplicate data in a storage system. According to an illustrative embodiment of the invention, a duplicate estimation application executes on a client of a storage system and is illustratively invoked by an administrator desiring an estimation of the amount of duplicate data on the system or on a sub-component, e.g., volumes, etc., thereof. In alternative embodiments, the duplicate estimation application may be automatically invoked by other processes, including, e.g., on a configurable schedule. Upon execution, the duplicate estimation application selects an element from an intended destination such as, e.g., a data store of the storage system. If the element is a file (or other data container), the application reads data from the file and computes a fingerprint of the read data. The computed fingerprint is then logged in a fingerprint database. This process repeats until the entire file (or other data container) has been read and fingerprinted. If the selected element is a directory, the application recursively scans the directory by selecting each of the files (or other data containers) contained therein and repeating the above-described process. If the selected element is a link, such as a hard and/or soft link, the application records state information, e.g., increments a counter to ensure that multiple references to a file (or other data container) do not over estimate data deduplication savings.

Once all elements have been scanned, fingerprinted and recorded, the application identifies any unique entries within the fingerprint database, i.e., the number of entries having unique fingerprints in the fingerprint database. The application may identify unique entries by, e.g., sorting the database and determining those entries that are not duplicated. In alternative embodiments, the fingerprint database may include functionality to determine duplicate entries. In such embodiments, the application may utilize the included database functionality to determine the unique entries. Utilizing this information, the application computes an estimated space savings that may be realized by employing a data de-duplication technique. Generally, only one copy of each entry having a unique fingerprint is retained after a de-duplication operation. Thus, the estimated storage savings may be computed by comparing the total number of entries to the number of entries having unique fingerprints. For example, if there are 1000 total entries in the fingerprint database and only 100 unique entries, there exists the possibility of reducing space consumed by the amount representative of the 900 duplicate entries.

The estimated savings is then displayed to an administrator. Such a display may be made via, a graphical user interface (GUI), a terminal display, etc.

Figure 5A:
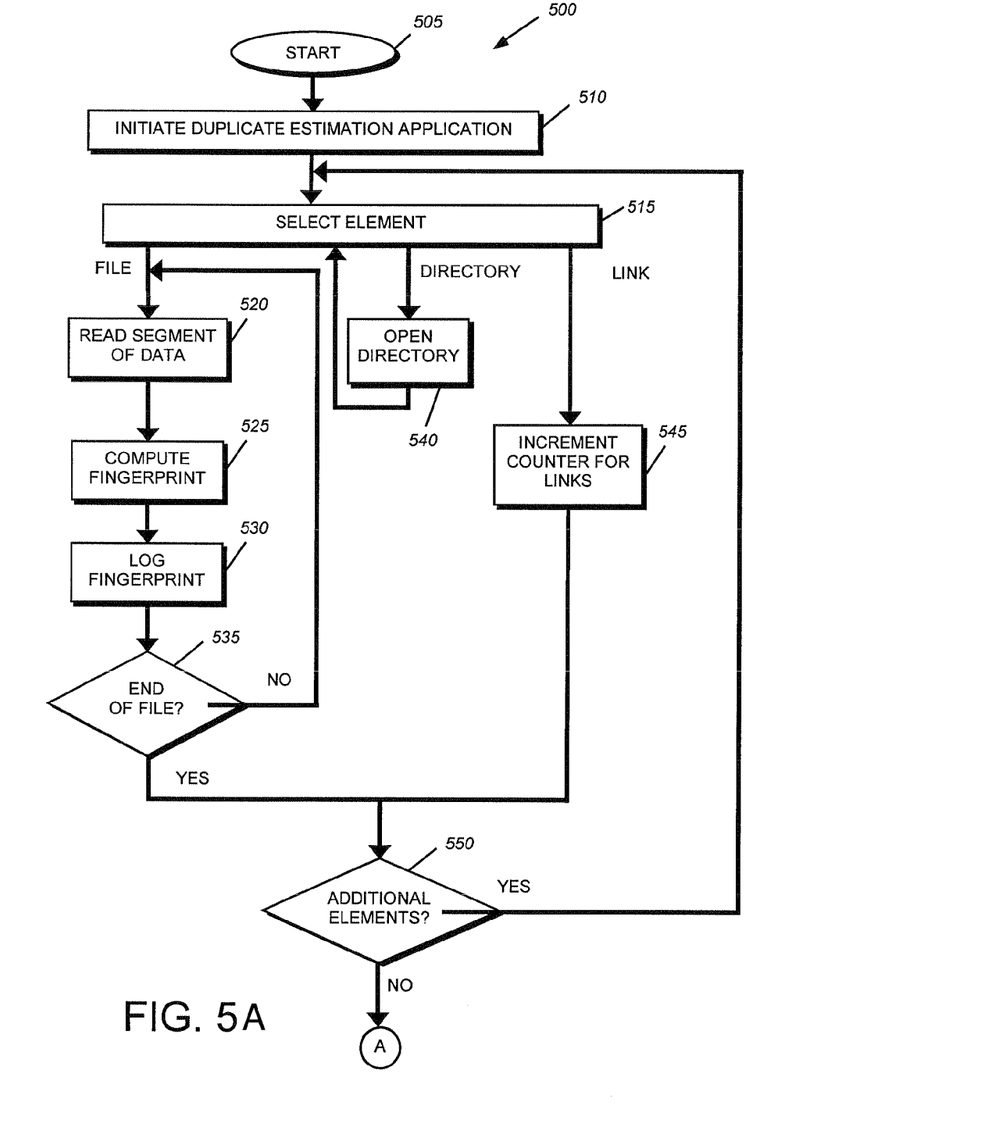
FIGS. 5A and 5B are a flowchart detailing the steps of a procedure for estimating duplicate data in accordance with an illustrative embodiment of the present invention.
Figure 5B:
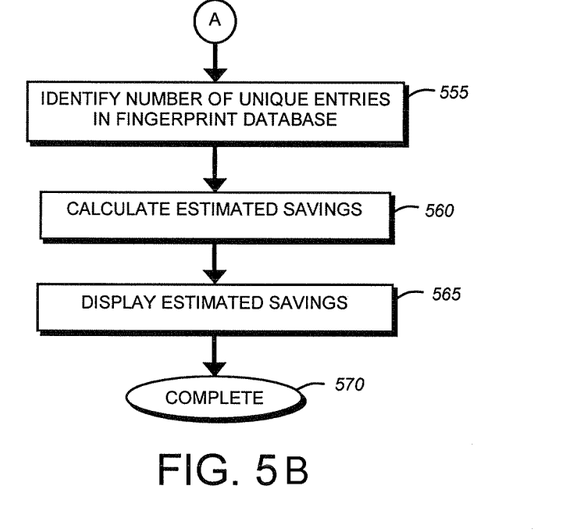

FIGS. 5A and 5B are a flow chart detailing the steps of a procedure 500 for estimating duplicate data in accordance with an illustrative embodiment of the present invention. The procedure 500 begins in step 505 and continues to step 510 where the duplicate estimation application 112 is initiated. Illustratively, the duplicate estimation application 112 may be initiated by, e.g., an administrator executing the duplicate estimation application on a client 110. However, in alternative embodiments the duplicate estimation application may be integrated with, e.g., the storage operating system. In such alternative embodiments, the application may be executed by user command, by preprogrammed and/or automated systems, etc. As such, the initiation of the duplicate estimation application by an administrator executing a command should be taken as exemplary only. Illustratively, when the administrator executes the duplicate estimation application, the administrator identifies a target data store. Illustratively, the data store may comprise, e.g., a file system, a volume, a directory/and/or subdirectories within the file system, etc. For example, an administrator may desire to determine the amount of duplicate data within the /usr directory of a storage system while disregarding potential duplicate data within other directories of the storage system. In response, the duplicate estimation application first selects an element from the identified data store in step 515. In accordance with an illustrative embodiment of the present invention an element may comprise, e.g., a file or other data container, such as a directory, a link, etc. In response to selecting, e.g., a file the application reads a segment of data from the file in step 520. Illustratively, the segment of data is of a predetermined size that is utilized for data de-duplication. In the illustrative embodiment, the segment size is 4 KB; however, in alternate embodiments, other sizes may be used. As such, the description of a 4 KB segment size should be taken as exemplary only. Furthermore, in alternative embodiments, fingerprints may be generated on variable length segments of data or may be generated on a plurality of segments of data. As such, the description of reading a segment of data and computing a fingerprint of the segment of data should be taken as exemplary only.

In step 525 the duplicate estimation application computes a fingerprint of the data that has been read. Illustratively, this fingerprint may be computed using a hash function, such as that described in the above-incorporated U.S. patent application Ser. No. 11/105,845. The computed fingerprint is then logged in the fingerprint database 600 in step 530. This may be performed by, e.g., using conventional database interfaces. In alternative embodiments, the fingerprint database may comprise a flat file. In such embodiments, the logging of the new fingerprint may be performed by appending the fingerprint to the file. It should be noted that other forms of interfacing with the fingerprint file may be utilized. As such, the interface to the fingerprint database described herein should be taken as exemplary only. In step 535, a determination is made at to whether the end of the file has been reached. If the end of the file has not been reached, the procedure loops back to step 520 where the application reads the next segment of data. However, if the end of the file has been reached, the procedure continues to step 550 where a determination is made as to whether additional elements exist that are to be scanned (selected). If there are additional elements, the procedure loops back to step 515 where the next element is selected.

However, if there are no additional elements to be fingerprinted, the duplicate estimation application identifies the number of unique entries in the fingerprint database in step 555. Identifying the number of unique entries in the fingerprint database may be performed using a number of differing techniques. One illustrative technique is to sort the entries of the fingerprint database and then eliminate duplicates, thereby leaving only unique entries. It should be noted that other techniques may be utilized. As such, the technique described herein should be taken as exemplary only. Utilizing the number of unique entries in the fingerprint database, the duplicate estimation application may calculate the estimated savings for de-duplication of the data set in step 560. Illustratively, the amount of savings is equal to the total number of fingerprints in the fingerprint database minus the total number of unique fingerprints. As noted above, if the fingerprint database comprises 1000 total entries with 100 unique entries, the possible savings is equal to the amount of space representative of the 900 duplicate entries. If each entry represents a, e.g., 4 KB block, then the estimated savings is 900*4 KB by de-duplicating the data. The estimated savings is then displayed in step 565. The procedure 500 completes in step 570.

In an alternative embodiment of the present invention, the estimate of duplicate data may be utilized to determine the amount of space savings possible by performing a de-duplication technique on the data store. Furthermore, in other alternative embodiments, the estimate of duplicate data may be utilized to determine the amount of bandwidth saved by transmitting de-duplicated data over a network compared to non-de-duplicated data. As such, the present invention may generally be utilized to determine an estimate of duplicate data in a particular data store. It should be noted that other uses for the estimate of duplicate data may be utilized in accordance with other embodiments of the present invention. As such, the description of using the estimate for space savings and/or bandwidth savings should be taken as exemplary only.

If, in step 515, it is determined that the data element is a directory, the procedure 500 branches to step 540 where the directory is opened. The procedure then loops back to step 515 where the data elements within the directory are opened. Also, in step 515, if it is determined that the data element is a link, such as a symbolic link or a hard link, the duplicate estimation application records state, e.g., increments a counter, for the link identifying which fingerprints are referenced by the link. By tracking the number of links to certain fingerprints, the present invention ensures that the fingerprints so referenced are not counted for each link. That is, the present invention ensures that a fingerprint referenced by one or more links is not factored in a plurality of times when determining the amount of free space that may be saved by use of de-duplication.

Figure 6:
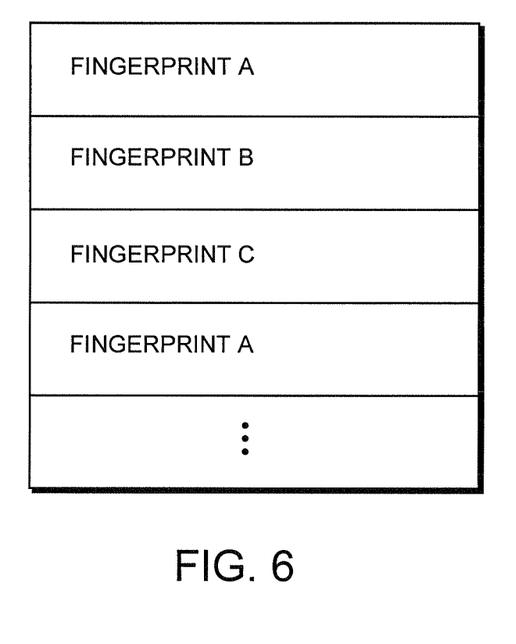
FIG. 6 is a schematic block diagram of an exemplary fingerprint database in accordance with an illustrative embodiment of the present invention.

FIG. 6 is a schematic block diagram of an exemplary fingerprint database 600 in accordance with an embodiment of the present invention. The fingerprint database 600 illustratively includes a plurality of entries such as, for example, an entry for fingerprint A, an entry for fingerprint B, an entry fingerprint C and an entry for fingerprint A, in addition to an additional entries. Each of the fingerprints within the fingerprint database represents a segment of data that has been read and fingerprinted. Thus, in the exemplary fingerprint database 600 shown in FIG. 6, two segments contain an identical fingerprint, namely fingerprint A. As a result of de-duplication, one segment is saved, i.e., only one copy of the data having fingerprint A is retained within the storage system. In accordance with an illustrative embodiment of the present invention, each fingerprint entry is marked as to whether it is generated as a result of a link or not. By tracking the number of fingerprints generated because of links, the present invention may ensure that linked data elements are not counted multiple times, thereby causing an incorrect estimation of duplicate data in the storage system.

The foregoing description has been directed to specific embodiments of this invention. It will be apparent, however, that other variations and modifications may be made to the described embodiments, with the attainment of some or all of their advantages. It is expressly contemplated that the procedures, processes, and methods described herein may be implemented in alternative orders. Furthermore, the teachings of this invention can be implemented as software (including a computer-readable medium having program instructions executing on a computer), hardware, firmware, or a combination thereof. While this description has been written in terms of a file system, the present invention also may be utilized with other data layout systems and with non-file system storage, such as luns and/or other block based storage. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method for estimating duplicate data, comprising:
   executing a duplicate estimation application on a system having a processor and memory;
   selecting a data element stored on a storage device of the system;
   reading a plurality of segments of data from the data element;
   computing a fingerprint for each of the plurality of segments to produce a plurality of fingerprints;

storing the plurality of fingerprints in a fingerprint database;

identifying a total number of fingerprints entries in the fingerprint database;

identifying a total number of unique fingerprint entries of the total number of fingerprint entries in the fingerprint database, wherein each unique fingerprint represents a single instance of a fingerprint in the total number of fingerprint entries in the fingerprint database;

calculating an estimated amount of duplicate data by multiplying a size of a segment of data to a value obtained by subtracting the total number of unique fingerprint entries in the fingerprint database from the total number of fingerprint entries in the fingerprint database; and providing the calculated estimated amount of duplicate data to a display, wherein the calculated estimated amount of duplicate data indicates estimated storage space saving that is realized by employing a data de-duplication technique to eliminate the duplicate data.

2. The method of claim 1 wherein the fingerprint database comprises a fingerprint database file.

3. The method of claim 1 wherein the selected data element comprises a file.

4. The method of claim 1 wherein size of the segment of data comprises 4 KB.

5. The method of claim 1 wherein the selected data element comprises a data container.

6. The method of claim 1 wherein reading the plurality of segments of data from the data element comprises reading the plurality of segments of data from a sub-component of the system.

7. A non-transitory computer-readable storage medium stored with executable program instructions for execution by a processor, the non-transitory computer-readable storage medium comprising:

program instructions that select a data element stored on a computer;

program instructions that read a plurality of segments of data from the data element;

program instructions that compute a fingerprint for each of the plurality of segments to produce a plurality of fingerprints;

program instructions that store the plurality of fingerprints in a fingerprint database;

program instructions that identify a total number of fingerprint entries in the fingerprint database;

program instructions that identify a total number of unique fingerprint entries of the total number of fingerprint entries in the fingerprint database, wherein each unique fingerprint represents a single instance of a fingerprint in the total number of fingerprint entries in the fingerprint database;

program instructions that calculate an estimated amount of duplicate data by multiplying a size of a segment of data to a value obtained by subtracting the total number of unique fingerprint entries in the fingerprint database from the total number of fingerprint entries in the fingerprint database; and program instructions that provide the calculated estimated amount of duplicate data to a display, wherein the calculated estimated amount of duplicate data indicates estimated storage space saving that is realized by employing a data de-duplication technique to eliminate the duplicate data.

8. A computing system, comprising:
a fingerprint database; and
a processor configured to operatively connect with the fingerprint database and a storage system, the processor configured to execute a duplicate estimation application to:
  (i) select a plurality of data elements from the storage system,
  (ii) read data from the plurality of data elements,
  (iii) compute a fingerprint for each of the plurality of data elements to produce a plurality of fingerprints,
  (iv) populate the fingerprint database with the plurality of fingerprints,
  (v) identify a total number of fingerprints entries in the fingerprint database populated with the plurality of fingerprints,
  (vi) identify a total number of unique fingerprint entries of the total number of fingerprint entries in the fingerprint database wherein each unique fingerprint represents a single instance of a fingerprint in the total number of is fingerprint entries in the fingerprint database,
  (vii) compute an estimated amount of duplicate data by multiplying a size of a segment of data to a value obtained by subtracting the total number of unique fingerprint entries in the fingerprint database from the total number of fingerprint entries in the fingerprint database, and
  (viii) providing the estimated amount of duplicate data to a display, wherein the estimated amount of duplicate data indicates estimated storage space saving that is realized by employing a data de-duplication technique to eliminate the duplicate data.

9. The system of claim 8 wherein the fingerprint database comprises a fingerprint log file stored on a storage device operatively connected with the processor.

10. The system of claim 8 wherein the plurality of data elements comprises a file.

11. The system of claim 8 wherein the plurality of data elements comprises a data container.

12. The system of claim 8 wherein the duplicate estimation application is further configured to, in response to selecting a directory as one of the plurality of data elements, read each data element within the directory and further configured to populate the fingerprint database based on the data elements within the directory.

13. The system of claim 8 wherein the duplicate estimation application is further configured to, in response to selecting a link as one of the plurality of data elements, record state information.

14. The system of claim 13 wherein the state information is utilized to prevent overestimation of the duplicate data due to a link to a data element.

15. The system of claim 13 wherein the duplicate estimation application is further configured to increment a counter to track a number of links to a fingerprint in the fingerprint database.

16. A system configured to estimate duplicate data, comprising:

means for executing a duplicate estimation application on a system having a processor and a memory;

means for selecting a data element stored on a storage device of the system;

means for reading a plurality of segments from the data element;

means for computing a fingerprint for each of the plurality of segments to produce a plurality of fingerprints;

means for storing the plurality of fingerprint in a fingerprint database;

means for identifying a total number of fingerprint entries in the fingerprint database;

means for identifying a total number of unique fingerprint entries of the total number of fingerprint entries in the fingerprint database wherein each unique fingerprint is represents a single instance of a fingerprint in the total number of fingerprint entries in the fingerprint database;

means for calculating an estimated amount of duplicate data by multiplying a size of a segment of data to a value obtained by subtracting the total number of unique fingerprint entries in the fingerprint database from the total number of fingerprint entries in the fingerprint database; and means for providing the calculated estimated amount of duplicate data to a display wherein the calculated estimated amount of duplicate data indicates estimated storage space saving that is realized by employing a data de-duplication technique to eliminate the duplicate data.

17. The system of claim 16 further comprising means for estimating bandwidth savings using the estimated amount of duplicate data.

* * * * *

UNITED STATES PATENT AND TRADEMARK OFFICE
CERTIFICATE OF CORRECTION

PATENT NO. : 8,793,226 B1  
APPLICATION NO. : 11/846033  
DATED : July 29, 2014  
INVENTOR(S) : Sandeep Yudav et al.

Page 1 of 1

It is certified that error appears in the above-identified patent and that said Letters Patent is hereby corrected as shown below:

In the Claims:

Claim 4, col. 13, line 25 should read:  
~~4. The method of claim 1 wherein size of the segment of~~  
4. The method of claim 1 wherein the size of the segment of Claim 7, col. 13, line 35 should read:  
~~a processor, the non-transitory computer-readable storage~~  
a processor, the computer-readable storage Claim 8, col. 14, line 19 should read:  
~~number of is fingerprint entries in the fingerprint~~  
number of fingerprint entries in the fingerprint Signed and Sealed this  
Fourteenth Day of October, 2014

Michelle K. Lee  
*Deputy Director of the United States Patent and Trademark Office*